(12) United States Patent
Spencer

(10) Patent No.: US 10,220,801 B1
(45) Date of Patent: Mar. 5, 2019

(54) VEHICLE PLATE FRAME WITH ORNAMENTS AND METHOD OF ASSEMBLY

(71) Applicant: Cruiser Accessories, LLC, Monument, CO (US)

(72) Inventor: Todd R. Spencer, Monument, CO (US)

(73) Assignee: Cruiser Accessories, LLC, Monument, CO (US)

( * ) Notice: Subject to any disclaimer, the term of this patent is extended or adjusted under 35 U.S.C. 154(b) by 0 days.

(21) Appl. No.: 15/997,432

(22) Filed: Jun. 4, 2018

(51) Int. Cl.
*B60R 13/10* (2006.01)
*G09F 7/18* (2006.01)

(52) U.S. Cl.
CPC .............. *B60R 13/105* (2013.01); *G09F 7/18* (2013.01); *G09F 2007/1895* (2013.01)

(58) Field of Classification Search
CPC .............. G09F 7/18; G09F 2007/1895; G09F 2007/1865
See application file for complete search history.

(56) References Cited

U.S. PATENT DOCUMENTS

| | | | |
|---|---|---|---|
| 2,968,109 A | 1/1961 | Timmins | |
| 3,753,285 A * | 8/1973 | Gewertz | A47G 1/0627 264/132 |
| 4,857,890 A * | 8/1989 | Solow | B60Q 1/56 340/479 |
| 5,192,125 A * | 3/1993 | Gonzalez | B60Q 1/50 362/216 |
| 6,027,235 A * | 2/2000 | Chen | B60Q 1/56 362/497 |
| D524,707 S | 7/2006 | Spencer | |
| D602,831 S | 10/2009 | Spencer et al. | |
| D636,713 S | 4/2011 | Ohm et al. | |
| D640,177 S | 6/2011 | Ohm et al. | |
| D662,448 S | 6/2012 | Krankkala et al. | |
| D721,998 S | 2/2015 | Spencer et al. | |
| D791,665 S | 7/2017 | Filakousky | |
| D792,825 S | 7/2017 | Filakousky | |
| 2011/0289806 A1 * | 12/2011 | Kuo | B60R 13/105 40/204 |

OTHER PUBLICATIONS

U.S. Appl. No. 29/636,876, Spencer, Todd et al.

* cited by examiner

*Primary Examiner* — Cassandra Davis
(74) *Attorney, Agent, or Firm* — Linda Flewellen Gould

(57) ABSTRACT

The present invention provides a frame for attaching a license plate or novelty plate to a vehicle, which frame includes a series of ornaments. The frame is constructed to enable an easy method of inserting and retaining the ornaments in the frame. The substantially rectangular frame surrounds an area suitable for viewing the plate when the frame is held adjacent to the plate by fasteners attaching the frame and the plate to the vehicle. A channel formed in the frame is suitable for receiving multiple ornaments. Assembly of the frame is particularly easy when the channel is accessible from the back of the frame. Dividing bars in the channel separate adjacent ornaments at desired intervals, while allowing the ornaments to be viewed from the front of the frame. A retaining mechanism holds the ornaments in the channel. A stopping mechanism prevents the ornaments from exiting the frame.

1 Claim, 3 Drawing Sheets

VEHICLE PLATE FRAME WITH ORNAMENTS AND METHOD OF ASSEMBLY

BACKGROUND OF THE INVENTION

Field of the Invention

The present invention relates to a specialized frame for holding a plate to a vehicle, which frame is adorned with ornaments. The frame is constructed to allow an easy method of placing the ornaments and assembling the frame.

Description of the Prior Art

All fifty United States and many countries and provinces worldwide require government-issued license plates to be attached to the rear of motor vehicles operating within their borders. Because some states and countries require a license plate to be attached to both the front and the rear of the motor vehicle, manufacturers typically provide a standard method and space for attaching such license plates to the vehicles. In jurisdictions where license plates are not required on the front of a vehicle, car owners often choose to attach a plate with a particular design or message, sometimes called a vanity plate or novelty plate, to the front of the vehicle in the space provided by the manufacturer of the vehicle for a license plate.

Vehicle owners often choose to decorate around the license plate or novelty plate with a stylized frame that surrounds the plate and adds aesthetic appeal. Such frames are typically rectangular in shape, with the frame surrounding an open area through which the plate can be viewed. The frame is frequently attached to the vehicle with screws or other fasteners which hold the license plate on the vehicle. License plate frames are available in a wide variety of designs. By way of example, U.S. Design Pat. No. 524,707 to Spencer, U.S. Design Pat. Nos. 602,831 and 721,998 to Spencer et al., U.S. Design Pat. No. 662,448 to Krankkala, et al., U.S. Design Pat. Nos. 636,713 and 640,177 to Ohm et al., and U.S. Design Pat. No. 791,665 to Filakousky all illustrate particular designs of license plate frames. Applicant has applied for a design patent for the aesthetic elements of the instant invention, with unpublished application 29/636,876.

Ornamented license plate frames are made in a variety of ways. Typically, only a small space is available to surround the license plate without interfering with other vehicle features, such as lights and bumpers. Therefore, construction of an ornamented plate frame can be labor-intensive and difficult, as small ornaments are placed in a limited space.

Similar constraints have been addressed in other contexts. For example, U.S. Pat. No. 2,968,109 teaches a frame for holding mementoes, which is intended to display both a photograph and a small locket. The locket is inserted in a groove in one of two plates surrounding the photo, while the plates are held together by two pillars fit into a block base. This structure may work well for displaying a baby photograph and locket, but would not fit within the area of a vehicle designed to accommodate a license plate.

It is desirable to have a frame suitable for attaching a license plate to a vehicle, which frame can be easily assembled to provide multiple ornaments of various types surrounding the area for viewing the plate.

SUMMARY AND OBJECTS OF THE INVENTION

A primary object of the present invention is to provide a method of easily adding and securing ornaments to a frame for holding a plate on a vehicle.

Another object of the present invention is to provide a frame for attaching a plate to a vehicle which frame can be easily adorned with ornaments.

These objects are achieved by a device consisting of a specialized frame, having an attachment mechanism for attaching the frame to a vehicle with a license plate or novelty plate held between the frame and the vehicle. Ideally, the frame is substantially rectangular in shape, corresponding to the size and shape of a vehicle plate which can be viewed through an open area surrounded by the rectangular frame. The frame may be a rectangle with straight corners or a modified rectangle with rounded corners, either of which shapes are referred to herein as "rectangular".

To provide a method of easily assembling the frame with a minimum of labor and difficulty, the frame is formed with a channel into which ornaments may be inserted. Dividing bars are provided, substantially perpendicular to the edges of the frame, throughout the channel. The dividing bars are placed at chosen intervals suitable for separating adjacent ornaments. The dividing bars can also provide strength to the frame, holding the edges of the channel in place with respect to each other.

If the dividing bars are situated toward the front face of the frame, the channel is easily accessible from the back face of the frame. Thus, multiple ornaments can be placed into the channel from the back face of the frame. Any number of types of ornaments are possible, including ornaments that look like pearls, diamonds, or other gems. It is preferable that the ornaments be of a size and shape that will fit completely within the edges of the frame's channel.

A retaining mechanism is designed to keep the ornaments in place after they have been inserted in the channel. Retaining mechanisms known in the art, such as glue, are possible. In a preferred embodiment, the retaining mechanism consists of a ring which is sized and shaped to fit tightly within the channel. This retaining ring can be forced into the channel on top of the ornaments, fitting in such a manner that neither the ornaments nor the ring can move unless the ring is physically pried out of the channel. It is possible to further secure the ring within the channel by a series of tabs on the ring that fit into corresponding slots in the channel. Ideally, the ring can be pried out of the channel if it is desirable to change which ornaments are placed in the channel from time to time.

The retaining mechanism virtually eliminates the possibility of ornaments accidently falling out of the back side of the frame's channel. While the retaining mechanism prevents the ornaments from exiting the back face of the frame, it is desirable to have a stopping mechanism that prevents the ornaments from exiting the front face of the frame. It is necessary that the stopping mechanism allow the ornaments to be viewed from the front of the frame, to provide the desired aesthetic effect. Several stopping mechanisms are useful for this purpose.

For example, the ornaments may be held in place by glue. A novel and useful stopping mechanism can be provided by shaping each ornament so that the front of the ornament is small enough to fit between adjacent dividing bars, but the back of the ornament is larger than the front and too big to move out of the frame between adjacent dividing bars.

In a preferred embodiment, the ornaments are provided on a linked string, of a size that is easily fit into the channel of the frame. Each ornament is sized to fit in between adjacent dividing bars. Once in place with the ornaments separated by the dividing bars, the link connecting adjacent ornaments to each other is adjacent to a dividing bar and hinders the ornaments from moving past the dividing bars to exit the front of the frame. The linked ornaments can be easily placed in position to be viewed from the front of the frame, and then secured in place by a retaining mechanism.

The frame is particularly suitable for easy assembly when each ornament fits snugly between adjacent dividing bars. However, the device may also be advantageous for displaying groups of ornaments, with dividing bars positioned to separate one group of ornaments from another.

Figure 1:
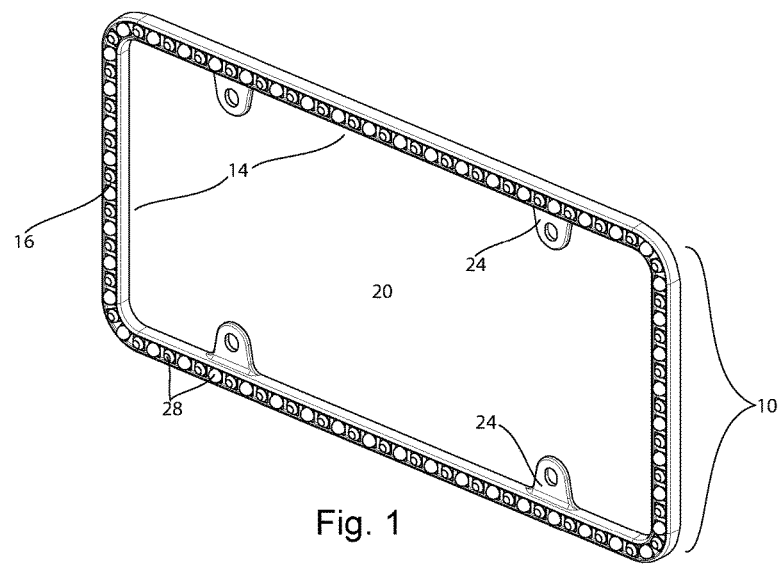
FIG. 1 is a front perspective view of a vehicle plate frame with ornaments, according to the present invention.

In the drawings, the following legend has been used:

| | |
|---|---|
| 10 | Vehicle plate holding device |
| 12 | License or novelty plate |
| 14 | Rectangular frame |
| 16 | Frame front face |
| 18 | Frame back face |
| 20 | Plate viewing open area |
| 22 | Fasteners |
| 24 | Attachment tabs |
| 26 | Channel |
| 28 | Ornaments |
| 30 | Dividing bars |
| 32 | Retaining means such as retaining ring |
| 36 | Ornament stopping means |
| 38 | Links between ornaments |
| 40 | Ornament front |
| 42 | Ornament back |

DESCRIPTION OF THE PREFERRED EMBODIMENT

The present invention provides a frame for attaching a plate to a vehicle, with the unique feature of providing a method of easily assembling the frame with ornaments viewable from the front of the frame. In the following description, numerous specific details are set forth in order to provide a thorough understanding of the present invention. It will be obvious, however, to one skilled in the art that the present invention may be practiced with variations to or even without one or more of these specific details. Some well-known methods and structures have not been set forth in order not to unnecessarily obscure the description of the present invention.

Figure 3:
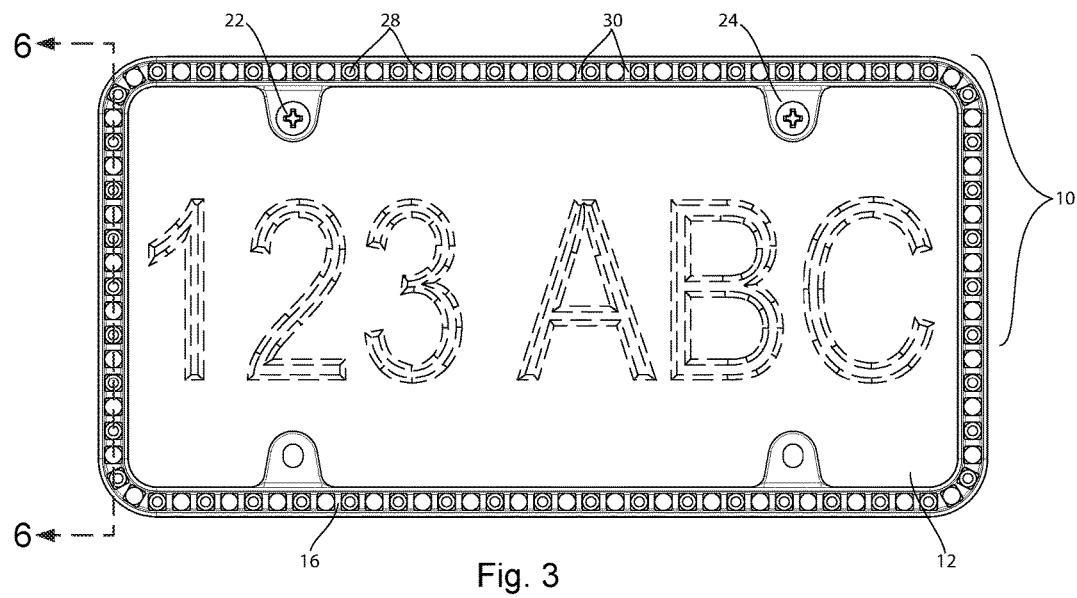
FIG. 3 is a front view of a vehicle plate frame, according to the present invention.
Figure 4:
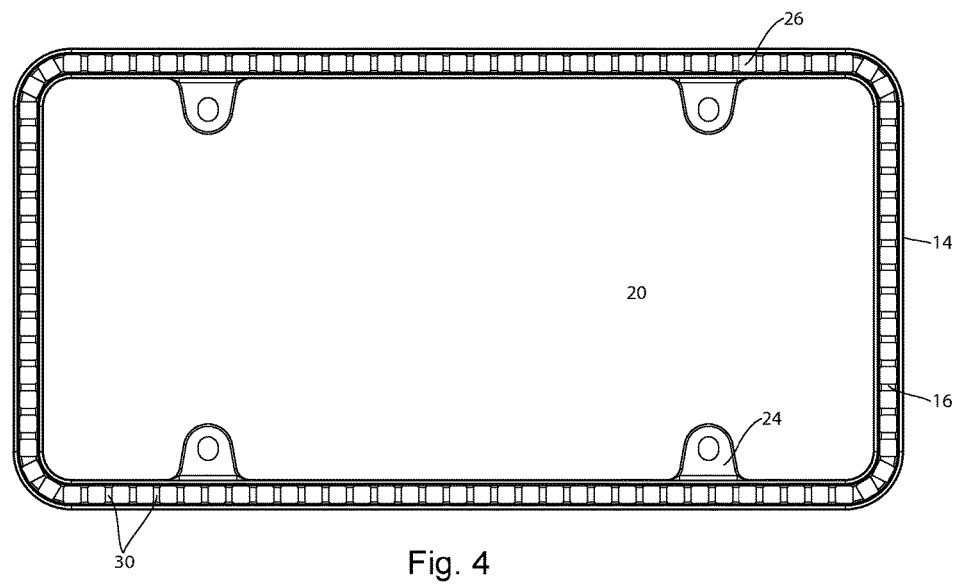
FIG. 4 is a front view of a vehicle plate frame of the present invention, prior to the insertion of ornaments.
Figure 5:
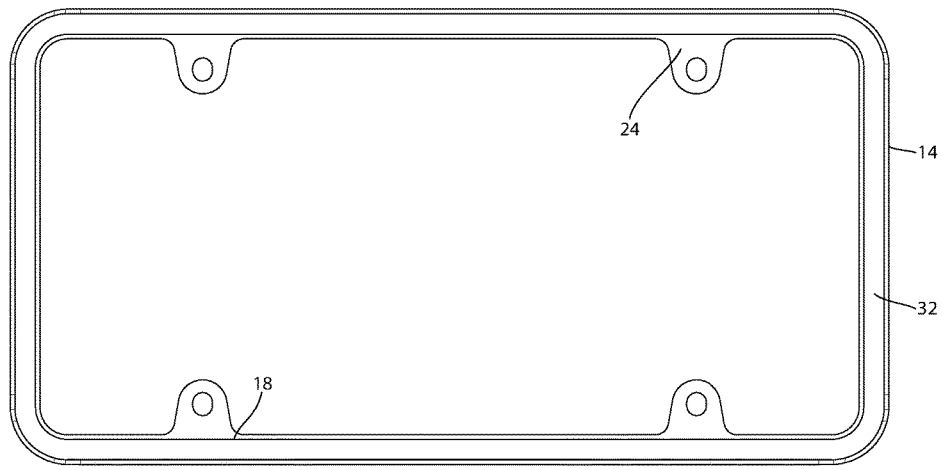
FIG. 5 is a back view of a vehicle plate frame of the present invention.

As shown in FIG. 3, a license plate holding device 10 may conveniently be used to attach a plate 12 to a vehicle (not shown). Numerous connection methods may be used to attach the frame 14 and plate 12 to the vehicle, including a conventional method of inserting a screw or other fastener 22 in aligning holes formed in attachment tabs 24 extending from the frame 14, in the plate 12, and in the vehicle. In this manner, a license plate or vanity plate 12 is held between the vehicle and the frame 14, in the location on the vehicle provided by the vehicle manufacturer for government-required license plates.

The substantially rectangular frame 14 of the plate holding device 10 has a front face 16 and back face 18. The frame 14 surrounds an area 20 suitable for viewing the plate 12 when the frame 14 and plate 12 are mounted on a vehicle, as best shown in FIG. 3.

Figure 7:
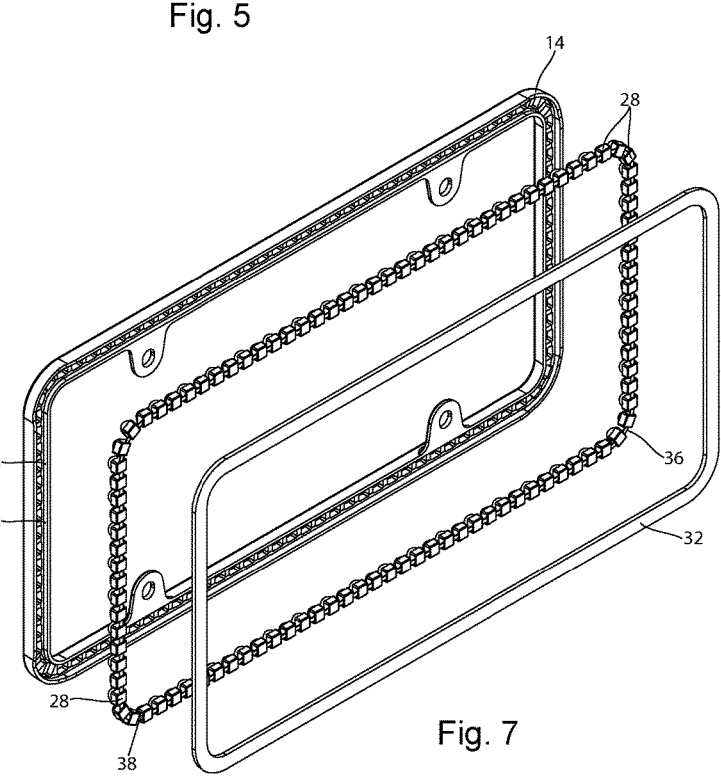
FIG. 7 is a back exploded perspective view of a vehicle plate frame of the present invention.

To provide a method for easily assembling the license plate holding device 10, a channel 26 is formed in the back face 18 of the frame 14, as shown in FIG. 7. Dividing bars 30 are spaced at desired intervals along the channel 26, to provide spaces of preferred size for receiving ornaments 28 to be visible through the front face 16 of the frame 14. Each dividing bar 30 can advantageously be positioned perpendicular to the portion of the frame 14 in which that dividing bar 30 is placed, providing support for the channel 26.

It is advantageous for the back side of the channel 26 to be easily accessible, so that ornaments 28 can be simply dropped into the channel 26 during assembly of the device 10. Accessibility of the back side of the channel is conveniently accomplished by positioning the dividing bars 30 closer to the front face 16 of the frame 14 than the back face 18.

Figure 6:
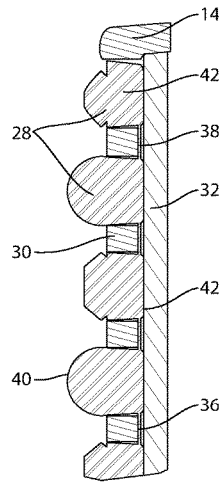
FIG. 6 is a cross-sectional magnified view taken on line 6-6 of FIG. 3.

A wide variety of ornaments 28 can be placed in the channel 26, including ornaments 28 that resemble pearls, diamonds, and other jewels. The ornaments may be of different sizes. Ideally, each ornament 28 is of a size that fits within the channel 26 with visibility through adjacent dividing bars 30. To avoid interference with the vehicle and to provide for an easy method of retaining each ornament 28 within the frame 14, it is desirable that each ornament 28 fit completely within the channel 26 and not protrude from the back face 18 of the frame 14, as best shown in FIG. 6.

Once the ornaments 28 are placed in the channel 26, a retaining mechanism 32 is provided. Many retaining mechanisms known in the art can be used, including glue or other adhesive chemicals. In a preferred embodiment, a retaining ring 32 is sized to fit snugly within the channel 26. Thus, during the claimed method of assembling the plate holding device 10, ornaments 28 are inserted into the channel 26, followed by placement of the retaining ring 32. The retaining ring 32 may conveniently be held in place by an adhesive or simply sizing the retaining ring to ensure a tight fit within the channel 26. In this manner, the ornaments 28 and retaining ring 32 are held in place despite possible jostling as the vehicle moves.

To prevent ornaments 28 from falling out of the front face 16 of the frame 14, a stopping mechanism 36 can be provided. For example, each ornament 28 can be conveniently shaped and sized so that the ornament front 40 fits between adjacent dividing bars 30 into a position from which the ornament front 40 is visible, while the ornament back 42 is too large to move through the space in between the adjacent dividing bars 30.

Figure 2:
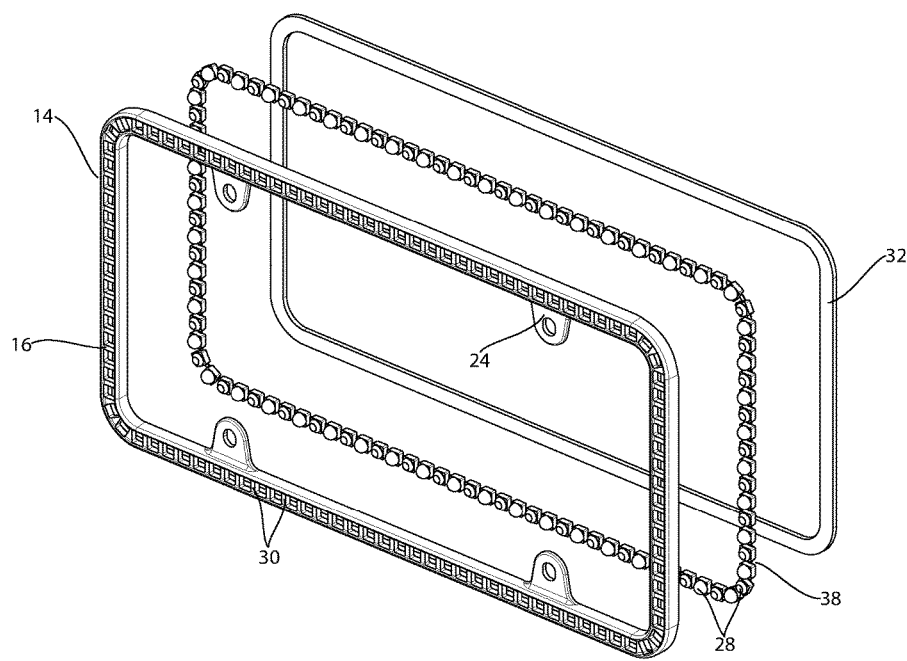
FIG. 2 is a front exploded perspective view of a vehicle plate frame, according to the present invention.

In a preferred embodiment illustrated in FIG. 2 and FIG. 7, the ornaments 28 may be constructed as part of a continuous ring, with links 38 between each pair of adjacent ornaments 28. In this manner, the continuous ring of ornaments 28 can easily be dropped into the channel 26, with the link 38 between each pair of adjacent ornaments 28 becoming the stopping mechanism 36 as the link 38 is prevented from moving forward by a dividing bar 30.

Although the present invention has been described in terms of the presently preferred embodiments, it is to be understood that such disclosure is purely illustrative and is not to be interpreted as limiting. Consequently, without departing from the spirit and scope of the invention, various alterations, modifications, or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

I claim:

1. A method of assembling a frame for holding a plate to a vehicle, said method comprising the steps of:
   a. forming a substantially rectangular frame having a front face and a back face surrounding an open area suitable for viewing the plate when the frame is held in front of the plate,
   b. forming a channel in said frame suitable for receiving a plurality of ornaments, said channel having dividing bars spaced at chosen intervals suitable for separating said ornaments,
   c. linking adjacent ornaments to each other into a continuous ring suitable for placing in said channel,
   d. inserting said ornaments through said back face of said frame into said channel, and
   e. retaining said ornaments within said channel.

* * * * *